UNITED STATES PATENT OFFICE.

CHARLES KELLNITZ, NEW YORK, N. Y.

IMPROVEMENT IN DENTAL COMPOUNDS FOR FILLING TEETH.

Specification forming part of Letters Patent No. 157,838, dated December 15, 1874; application filed September 16, 1874.

*To all whom it may concern:*

Be it known that I, Dr. CHARLES KELLNITZ, of New York, in the county of New York and State of New York, have invented certain new and useful Improvements in Dental Compounds for Filling Teeth; and I do hereby declare that the following is a full, clear, and exact description thereof.

The nature of my invention consists in a composition called white plastic diamond cement, to be used by dentists for filling teeth, as will be hereinafter more fully set forth.

My composition is formed of a powder and a liquid, which are kept in separate bottles or vessels until desired for use, when only so much as is required for immediate use is taken out of each.

The liquid is composed of zinc, spirits of salt, or muriatic acid, and borax, in the following manner: One part of zinc is dissolved in spirits of salt, or muriatic acid, over a slow fire until it is neutralized, and then the solution is evaporated by heat until it attains the specific gravity of 1.50. One part of borax is then dissolved in the smallest possible quantity of water. One part of the borax solution is then added to fifty parts of the zinc solution while the latter is yet warm, and stirred, after which it is allowed to stand for half a day, more or less, when it can be filtered, and is ready for use.

The powder is composed of oxide of zinc and powdered glass. The glass should be powdered to about the degree of coarse or medium fine flour, and washed, after which it is dried in an oven or stove. It is then mixed at the rate of one part powdered glass to two parts oxide of zinc.

In using these compounds the tooth is to be prepared for filling the same as usual. A suitable quantity of the powder is then mixed with so many drops of the liquid as will make a very thick and stiff ball, having no moisture on the outside. The composition is then yet very plastic, and is at once placed in the already-prepared tooth and covered with cotton, to prevent the saliva to come in contact therewith. In from eight to ten minutes it becomes perfectly hard in the tooth, and resembles alabaster. It neither shrinks nor expands in hardening, and shuts up the nerve hermetically, thus securing it against all external influences, and it is in no way injurious to the health.

Having thus fully described my invention, what I claim as new, and desire to secure by Letters Patent, is—

1. The within-described liquid, composed of zinc, spirits of salt, or muriatic acid, and borax, and used in combination with a suitable powder, for the purposes herein set forth.

2. The within-described powder, composed of oxide of zinc and powdered glass, and used in combination with a suitable liquid, for the purposes herein set forth.

In testimony that I claim the foregoing as my own I affix my signature in presence of two witnesses.

DR. CHARLES KELLNITZ.

Witnesses:
T. H. ALEXANDER,
C. ALEXANDER.